United States Patent [19]

Kimura

[11] 3,930,265

[45] Dec. 30, 1975

[54] HIGH DENSITY MAGNETIC STORAGE SYSTEM

[75] Inventor: Noboru Kimura, Gardena, Calif.

[73] Assignee: VRC California, Inc., El Segundo, Calif.

[22] Filed: June 7, 1974

[21] Appl. No.: 477,447

[52] U.S. Cl. .................................................. 360/45

[51] Int. Cl.$^2$ ........................................... G11B 5/09

[58] Field of Search ............. 360/39, 40, 41, 45, 46, 360/51, 48; 340/347 DD

[56] References Cited

UNITED STATES PATENTS

| | | | |
|---|---|---|---|
| 3,226,685 | 12/1965 | Potter et al. | 360/40 |
| 3,577,192 | 5/1971 | Schlzejofer | 360/40 |
| 3,588,836 | 6/1971 | Frazier, Jr. | 360/40 |
| 3,622,894 | 12/1971 | Heidecker | 360/40 |
| 3,641,525 | 2/1972 | Milligan | 360/40 |
| 3,643,228 | 2/1972 | Lipp | 360/40 |
| 3,648,265 | 3/1972 | Kobayashi et al. | 360/40 |
| 3,750,121 | 7/1973 | Lee | 360/40 |

*Primary Examiner*—Vincent P. Canney
*Attorney, Agent, or Firm*—Fraser and Bogucki

[57] ABSTRACT

Apparatus and method for high track density magnetic recording and retrieval. A decoder-coupled five bit shaft register converts an incoming data bit stream to a converted data bit stream having successive groups of five bits corresponding to successive groups of four bits of the incoming stream, the converted stream having not more than two adjacent binary "1's". A shift register-coupled NRZO encoder provides a self-clocking tri-frequency signal allowing a clocking window margin of one-half a converted bit cell. The tri-frequency signal has a primary frequency component and additional frequency components of one-half and one-third the primary frequency and is applied to an NRZO encoder coupled modulator. The modulator introduces flux reversals at double the primary frequency following the maintenance of the three-frequency signal in excess of one bit cell interval, enhancing the ratio of timing margin to maximum distance between flux reversals. Both fringing field effects on adjacent tracks and intersymbol interference between linearly adjacent bits of a magnetic recording medium are minimized in a storage system having a track density in excess of about 500 tracks per inch and a linear bit density on the order of 4000 bits per inch. An amplifier-coupled slope detector detects playback signal slope polarity changes to provide a coded output signal.

33 Claims, 5 Drawing Figures

| INCOMING DATA (4 BITS) | | | | | 5/4 CODED | | | | |
|---|---|---|---|---|---|---|---|---|---|
| BINARY | MSB C1 | C2 | C3 | C4 | C1 | C2 | C3 | C4 | LSB C5 |
| 0 | 0 | 0 | 0 | 0 | 0 | 0 | 0 | 0 | 0 |
| 1 | 0 | 0 | 0 | 1 | 0 | 0 | 0 | 0 | 1 |
| 2 | 0 | 0 | 1 | 0 | 0 | 0 | 0 | 1 | 0 |
| 3 | 0 | 0 | 1 | 1 | 1 | 0 | 1 | 1 | 0 |
| 4 | 0 | 1 | 0 | 0 | 0 | 0 | 1 | 0 | 0 |
| 5 | 0 | 1 | 0 | 1 | 0 | 0 | 1 | 0 | 1 |
| 6 | 0 | 1 | 1 | 0 | 0 | 0 | 1 | 1 | 0 |
| 7 | 0 | 1 | 1 | 1 | 1 | 0 | 1 | 0 | 1 |
| 8 | 1 | 0 | 0 | 0 | 0 | 1 | 0 | 0 | 0 |
| 9 | 1 | 0 | 0 | 1 | 0 | 1 | 0 | 0 | 1 |
| 10 | 1 | 0 | 1 | 0 | 0 | 1 | 0 | 1 | 0 |
| 11 | 1 | 0 | 1 | 1 | 1 | 0 | 1 | 0 | 0 |
| 12 | 1 | 1 | 0 | 0 | 0 | 1 | 1 | 0 | 0 |
| 13 | 1 | 1 | 0 | 1 | 0 | 1 | 1 | 0 | 1 |
| 14 | 1 | 1 | 1 | 0 | 1 | 0 | 0 | 0 | 1 |
| 15 | 1 | 1 | 1 | 1 | 1 | 0 | 0 | 0 | 0 |

HIGH DENSITY MAGNETIC STORAGE SYSTEM

BACKGROUND OF THE INVENTION

1. Field of the Invention

This application relates to magnetic recording and retrieval techniques, and more particularly to coding and encoding apparatus for a high track density magnetic recording system.

2. History of the Prior Art

In recent years, there has been a trend toward developing high density random access memory systems capable of compactly storing large quantities of digital information on a magnetic medium such as a magnetic disk or drum. Units having high track densities as well as high linear bit densities have made apparent new problems and limitations of prior systems. The need to consider effects of interference between adjacent tracks was minimal prior to the introduction of high density magnetic memories. However, in storage systems having track densities in excess of about 500 tracks per inch, magnetic fields from closely adjacent tracks may cause substantial signal degradation, distortion and shifting.

Under ideal conditions, the width of a recording head at its portion adjacent the surface of the magnetic medium determines track width. It would be theoretically possible to avoid the necessity for large guard bands, were it not for the fringing field effects of magnetic information laid on adjacent tracks and fringing fields of the magnetic recording heads.

High linear bit density also results in signal degradation and in peak shifting reducing the ability to distinguish recorded information. Peak shifting and its undesirable effects are substantially determined by allowable timing margin and maximum distance between flux reversals. The worst case timing margin, inherently defined by the particular type of coding scheme must be sufficient to distinguish between the presence at or absence of intended flux reversals during a particular time interval. Large distances between flux reversals may substantially increase peak shifting, both from closely adjacent tracks and linearly adjacent bits. The ratio of normalized timing margin to normalized distance between flux reversals defines a figure of merit which bears a relation to density limitations in low redundancy magnetic recording.

Various coding schemes in the past have included Manchester coding in which peak shifting is not of concern because of predictable clocking flux reversal cell boundaries. However, the Manchester clocking flux reversals limit worst case recording density to only 50 percent efficiency.

Miller coding, also self-clocking, is 100% efficient and is commonly used. In Miller coding, flux transitions are made at boundaries of bit cell intervals for all ones to be recorded. Transitions are made at the center of each bit cell interval for each zero after a first zero recorded. The greatest distance between flux reversals using a Miller code is one bit cell interval and maximum timing margin is ± ¼ bit cell. In an attempt to reduce the distance between flux reversals, in Miller coding systems, modulation circuits have been used which introduce flux reversal components into the recording signal at the rate of four reversals per bit cell interval where no flux reversal has occurred for the duration of a bit cell interval. The maximum distance between flux reversals is reduced to one bit cell interval. The ratio of timing margin to maximum distance between flux reversals is ± ¼. Although Miller coding is 100 percent efficient, it would be beneficial to have a recording system with an increased ratio to allow higher density recording.

One method of recording which has been described has added an additional bit to a binary code consisting of a given number of bits to provide a code such that no more than two bits at the same binary level occur adjacent one another and then applied the coded signal to an appropriate NRZ type (e.g., NRZO) encoder. The NRZ type encoder provided a signal having flux reversals at intervals of one, two and three bit cells, thus providing a timing margin of ± ¼ bit cell. The actual timing margin is slightly reduced as a result of introducing additional bits. Although such a code increases timing margin over that of the Miller code, the actual advantage is limited since the worst case or maximum distance between flux reversals is three bit cell intervals as compared with two bit cell intervals of Miller coding.

Other problems present in high density systems which include the susceptibility of narrow track width recording to noise from various sources, particularly since the amplitude of a signal generated from a narrow track head traversing a flux reversal is limited. Noise in turn affects the requirements for accuracy in timing to properly distinguish recorded information.

SUMMARY OF THE INVENTION

The present invention generally comprises a high track density magnetic recording system having a circuit for providing in response to a first signal, an information coded self-clocking signal having flux reversal components at a primary frequency at at one-half and one-third the primary frequency and a circuit for selectively modulating the information coded signal to reduce intersymbol interference between linearly adjacent data bits and between adjacent tracks. The three-frequency signal allows a timing margin of ± ½ bit cell interval, while the modulation components reduce the maximum distance between flux reversals.

The three-frequency signal may be obtained in many ways, one example of which is combining a converter circuit which generates a coded signal in response to an incoming data bit stream to be recorded, the coded signal having not more than two adjacent data bit intervals at a given binary level. The coded signal is applied to an appropriate NRZ type encoder to provide the desired three-frequency code.

The modulation circuit preferably reverses the signal applied to a recording head at double the primary frequency after the three-frequency signal is maintained at a single level for one bit cell interval.

In particular examples, a conversion circuit generates a bit stream of five bit cell fields corresponding to four bit cell fields of the incoming data bit stream such that the bit stream of five bit cell fields contains not more than two adjacent binary 1's. The five bit field data stream or converted signal is applied to a non-return-to-zero 0 (NRZO) coding circuit to provide an information coded self-clocking signal. The modulation means provides flux reversals at one-half bit cell intervals when an NRZO coded signal maintains a single binary state in excess of one bit cell interval. In this example, the NRZO signal is delayed by one bit cell interval. A signal representing the logical intersection of the delayed NRZO signal and the NRZO signal is used to gate to a magnetic head the NRZO signal except during the occurrence of the intersection signal during which time a modulated signal is applied to the magnetic head.

A data recovery system comprises amplification means coupled to slope detection circuit means for detecting changes in sensed flux reversal signal slopes polarity. In one example, the slope detection circuit includes an emitter follower circuit coupled to a phase shifting circuit. A voltage comparator has one input coupled to the phase shifting circuit and the other to an amplified and filtered transducer signal. The comparator provides a binary signal representing the coded information.

DETAILED DESCRIPTION

Figure 1:
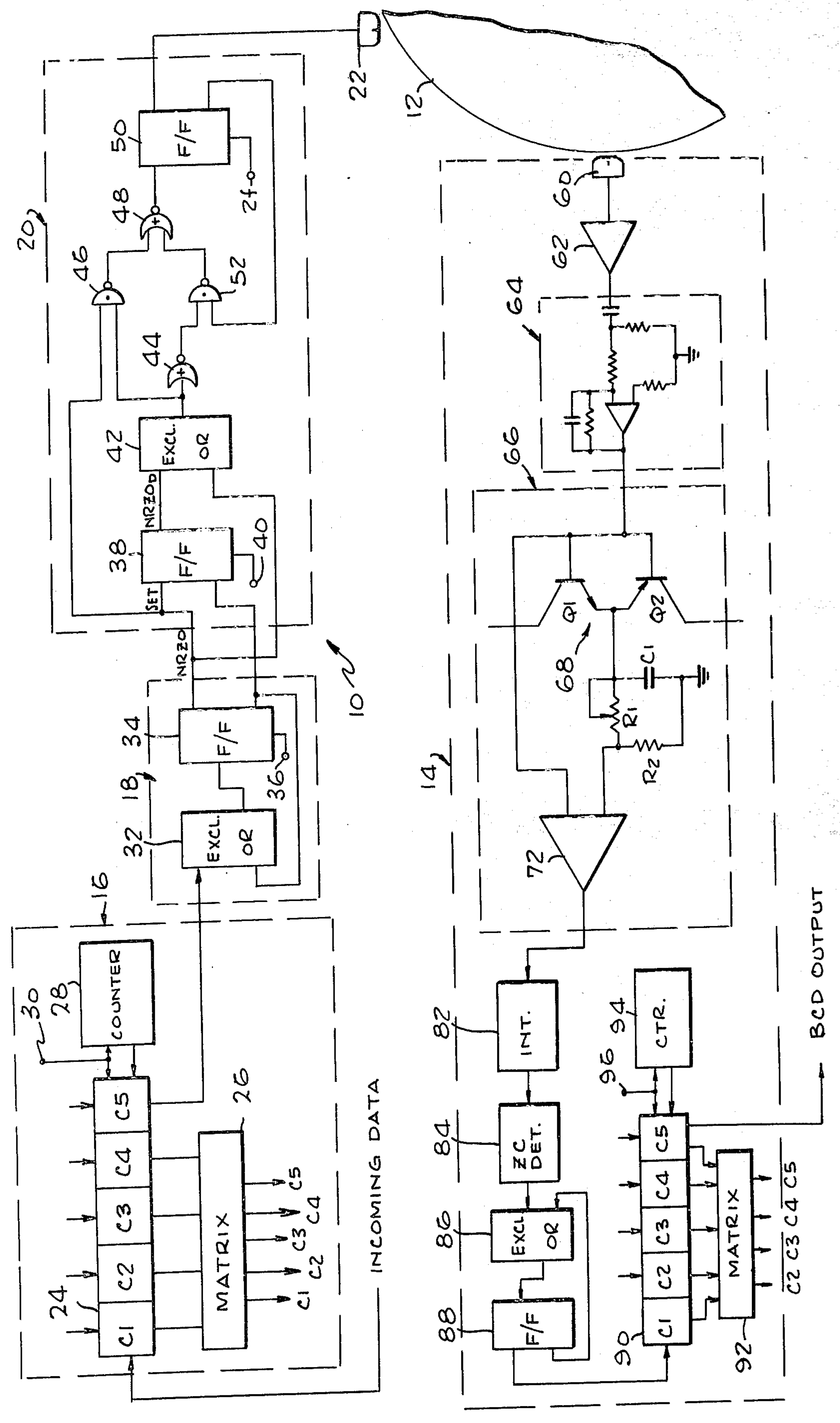
FIG. 1 is a block diagram of a preferred embodiment of a flux encoding and data recovery system in accordance with this invention.

Referring particularly to FIG. 1, a preferred embodiment of the system for the recording and retrieval of information in accordance with this invention comprises an encoding system 10 for encoding an incoming data bit stream and altering magnetic domains on a magnetic medium 12 in response thereto, and a data recovery circuit 14 for decoding magnetic pattern information recorded on the magnetic medium 12 with the encoding system 10.

The encoding system 10 comprises a 5/4 conversion circuit 16, an NRZO encoding circuit 18, a modulation circuit 20 and a magnetic recording head 22. The conversion circuit 16 has an input for receiving an incoming data bit stream and an output providing a 5/4 data bit stream having a five bit word length, each word representing a four bit length word of the incoming data bit stream. The conversion circuit 16 encodes the incoming data bit stream in accordance with the table of FIG. 2 which is described below in more detail. The essential requirement of the coded bit stream in the preferred embodiment is that not more than two adjacent bit cells contain binary 1's. This particular coding provides a self-clocking system when used in conjunction with the NRZO (non-return-to-zero 0) coding circuit 18. Although a 5/4 conversion circuit combined with an NRZo circuit is utilized in the preferred embodiment, it should be recognized that other encoding circuits may be used in accordance with this invention subject to the requirement that the coded, unmodulated signal has a primary flux reversal frequency and flux reversal components of one-half and one-third the primary frequency.

Figures 2, 3:
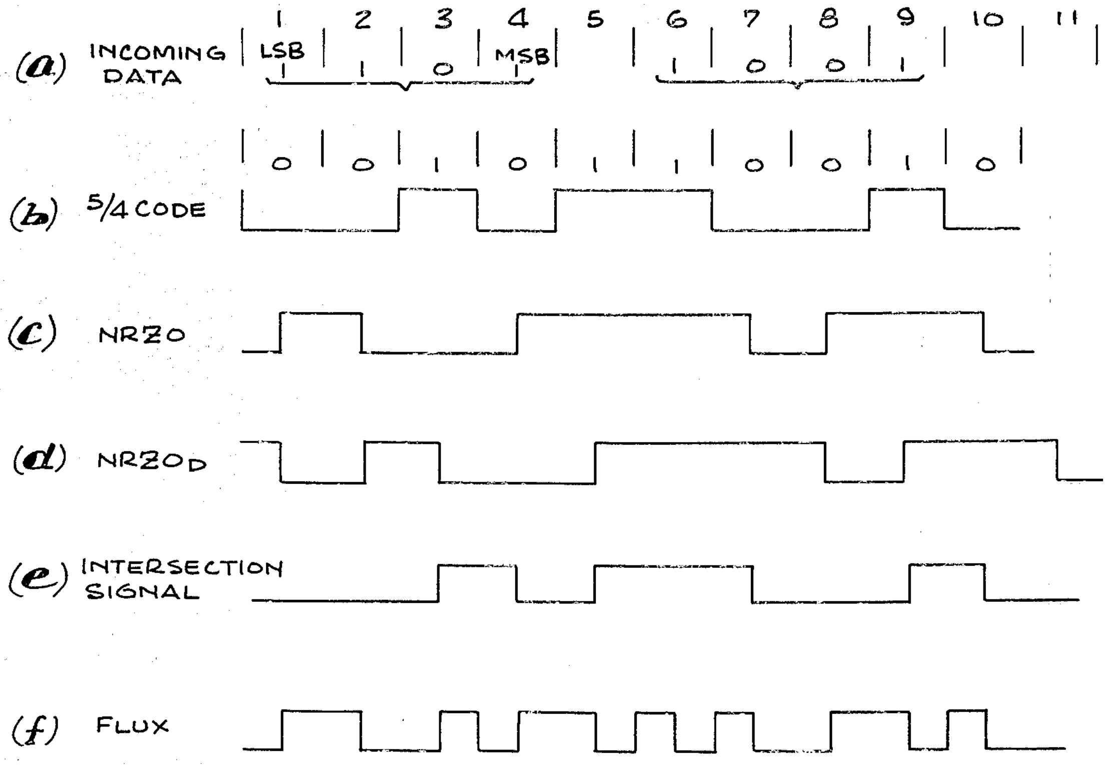
FIG. 2 is a table of a suitable code used in connection with the preferred embodiment depicted in FIG. 1.
FIG. 3 comprises six different signal waveforms useful in illustrating the operation of the embodiment depicted in FIG. 1.

The conversion circuit 16 includes a five bit shift register 24 comprising cells C1, C2, C3, C4 and C5, a decoder matrix 26 and a five bit counter 28. The decoder matrix 26 is coupled to the shift register 24 such that upon a fourth shift in a five shift cycle, the register 24 is loaded with a four bit word from the incoming data bit stream. The decoder matrix 26 is arranged such that when the data pattern of a binary "11," "14" or "15" as shown by the table of FIG. 2 is applied to the matrix 26, the next shift loads the complement of cells C1, C2, C3, C4 into C2, C3, C4, C5 respectively. Also a "1" is loaded in cell C1. When binary "3" or "7" is detected by the matrix 26, the output applied to C1 is "true" and the register 24 is forced into the bit configuration of table 1. In all other data patterns, the fifth shift through the register is made without alterations except that a "0" bit is inserted on the MSB (most significant bit) cell C1.

The five bit counter 28 is coupled to the shift register 24 and is synchronized with the incoming data to provide proper timing for data conversion. A bit clock input from a terminal 30 to the five bit counter 28 advances the counter 28 at bit cells intervals to gate the state of the LSB (least significant bit) cell C5 to the NRZO coding circuit 18. The counter 28 also provides a signal after a fourth shift or during a time cell $t_4$ to gate the state of bit cells C1, C2, C3, C4 to the decoder matrix 26, and apply the outputs of the matrix 26 to load the appropriate cells C1, C2, C3, C4, C5 with the coded information. A count of five bits resets the counter 28 and begins loading the next four bit word onto the shift register 24.

Each shift of the register 24 causes the state of the LSB cell C5 to be applied to the NRZO coding circuit 18. NRZO coding circuit 18 comprises an EXCLUSIVE OR gate 32 and a flip-flop 34 coupled thereto. The EXCLUSIVE OR gate 32 has one input coupled to the LSB output of the shift register 24, and another input coupled to a complementary output of FLIP-FLOP 34. A clock signal applied to a terminal 36 gates the FLIP-FLOP 34. The FLIP-FLOP 34 provides an NRZO coded signal and the complement thereof.

The NRZO signal changes in state or polarity intermediate a bit cell upon sensing each 0 signal during a bit cell as the FLIP-FLOP 34 is gated by the clock signals at terminal 36. The combination of the 5/4 conversion circuit 16 and the NRZO coding circuit 18 provides a signal having three component flux reversal frequencies, that of one flux reversal per bit cell interval, one flux reversal per two bit cell intervals and one flux reversal per three bit cell intervals.

The particular three-frequency signal which has been provided, such as by the combination of an 5/4 converter circuit and an NRZO encoder, is self-clocking, and has increased timing margins with respect to both Manchester and Miller coding. Manchester coding has a characteristic of ± ¼ bit cell timing margin, as does Miller coding. The three-frequency signal, having a primary flux reversal frequency and frequency components of one-half and one-third the primary frequency, has a characteristic timing margin of ± ½ bit cell interval.

In the preferred embodiment, which utilizes 5/4 coding, an additional bit cell must be inserted for each word. The actual window timing margin for this particular example is $(4/5) \times (\pm \frac{1}{2}$ bit cell interval$) = \pm 0.4$ bit cell interval.

Thus far, a system for recording has been described which provides optimal information packing in a self-clocking system by providing an increased timing tolerance. High tolerance is required where substantial noise and peak shift are encountered in high density systems. By way of example, the system described herein has been found useful in a system having a linear bit density on the order of 4000 bits per inch with a nominal 1 mil track width.

However, the benefit of high linear bit density and high track density systems are limited both by intersymbol interference between linearly adjacent bits and adjacent tracks. Noise levels in high linear bit density recording systems along with low signal levels make such systems sensitive to fringing field interference, particularly acute in high track density systems such as in excess of about 500 tracks per inch. In accordance with the invention fringing fields between adjacent tracks and between linearly adjacent data bits are reduced by coupling the NRZO circuit 18 to the modulation circuit 20. The NRZO coded signal is modulated so that the output of the modulation circuit 20 cause a head magnetization flux having a limited time between flux reversals, preventing magnetization patterns of single orientation domains. Strong magnetic fields of large magnetic domains influence magnetization patterns of adjacent bits and tracks causing distortion and reducing the effective signal-to-noise ratio, already low in high linear bit density systems. Modulated signals applied to the head thus increase the signal-to-noise ratio with respect to adjacent tracks and limit peak shifting. Thus, the invention limits time between flux reversals and enlarges window timing margin, thereby facilitating the recording of large quantities of information on a magnetic medium.

Two considerations are of substantial importance in minimizing the effect of peak shifting. These are the maximization of timing margin and minimization of the greatest distance between flux reversals. A figure of merit, previously noted, and defined by the ratio of timing margin to maximum distance between flux reversal provides some indication of susceptibility of a particular coding system to the undesirable effects of peak shifting. Manchester coding provides a ratio of $\pm \frac{1}{4}$, Miller coding provides a ratio of $\pm \frac{1}{8}$, while 5/4 coding provides a ratio of $\pm 1/6$. When normalized to account for different recording efficiencies, Miller coding and Manchester coding are on a par while the normalized 5/4 coding ratio is just slightly greater. However the effects of peak shifting and intersymbol interference are further reduced when the three-frequency signal of one flux reversal for one, two and three bit cells are modulated in accordance with this invention as described below.

In the preferred embodiment, the modulation circuit 20 inserts flux reversals where the NRZO coded signal is maintained at a single signal level in excess of one bit cell length. The NRZO circuit produces a tri-frequency signal such that a flux reversal is present, in absence of modulation, at intervals of one, two or three bit cells. The modulation circuit inserts flux reversals at double the primary frequency, during two bit cell and three bit cell intervals having no flux reversals. It has been found convenient to insert two flux reversals for the two bit cell interval after a single bit cell interval has passed and to insert four flux reversals in a three bit cell interval after a first bit cell interval has elapsed. Thus, the maximum distance between flux reversals is 1 and the ratio of timing margin to maximum distance between flux reversals is $\pm \frac{1}{2}$. When normalized to account for recording efficiency, this provides a ratio of $\pm 0.4$. The modulation circuit 20 coupled to the head 22 applies the modulated signal thereto.

The description of the following modulation circuit is provided by way of example, and other means for modulating the NRZO encoded signal will be apparent to one skilled in the art. The modulation circuit 20 comprises a flip-flop 38 (F/F) having a clock signal which is synchronized to the clock signal at terminal 36 applied to a terminal 40. A SET input of flip-flop 38 is coupled to an ouput of the NRZO coding circuit 18 to provide an NRZO signal delayed by one bit cell ($NRZO_D$) interval with respect to the output of the NRZO coding circuit 18. An EXCLUSIVE OR gate 42 has one input responsive to the delayed NRZO signal from the flip-flop 38 and another input responsive to the NRZO signal of the coding circuit 18. The EXCLUSIVE OR gate 42 provides a signal representing the complement of the logical intersection of the NRZO signal and the $NRZO_D$ signal. The logical intersection complement signal is applied to an inverter 44 providing a logical intersection signal. A NAND gate 46 has two inputs, one of which is coupled to the NRZO output of the coding circuit 18 and the other of which is coupled to the output of the EXCLUSIVE OR gate 42. The NAND gate 46 provides a signal which is the complement of the NRZO signal when the intersection complement signal of EXCLUSIVE OR gate 42 is binary 1, and binary 1 when the intersection complement signal is 0. NOR gate 48 has an input coupled to the output of NAND gate 46, thereby providing a signal corresponding to the NRZO signal when the intersection complement signal is binary 1. A flip-flop 50 has an input coupled to an output of the NOR gate 48, an output coupled to the magnetic head 22 and a complementary output coupled to an input of a NAND gate 52. The output of flip-flop 50 assumes the state of the input upon the occurrence of a clock pulse. Flip-flop 50 is clocked at double the bit frequency which is double the frequency of the highest flux reversal frequency.

The output of the inverter 44 is coupled to an input of the NAND gate 52 for applying the intersection signal thereto. When the intersection signal is "on", the complement of the flip-flop 50 output is applied, via NOR gate 48, to the input of flip-flop 50. Since the flip-flop 50 is clocked twice during each bit cell interval, when the intersection signal is on the flip-flop 50 output changes levels twice every bit cell interval providing a corresponding modulation component to the flux signal. When the intersection signal is off, in the binary 0 state, NAND gate 52 is inhibited, NAND gate 46 is on, and the NRZO signal is applied to the recording head 22.

Thus the modulation circuit 20 delays the NRZO signal by one bit cell and provides a signal representing the logical intersection of the NRZO signal and the $NRZO_D$ signal. The intersection signal is used to gate to the magnetic head 22 the NRZO signal except during the occurrence of the intersection signal, during which time a modulated signal is applied to the magnetic head 22.

FIG. 3 (*a–f*) depicts a data pattern of an imcoming data bit stream and signals obtained therefrom in connection with the invention. The incoming data of FIG. 3 (*a*) by way of example is in BCD (binary coded decimal) form, each four bit word representing a single decimal numeral. The 5/4 conversion circuit 16 provides a signal in response to the incoming data depicted in FIG. 3 (*a*), as shown in FIG. 3(*b*). Note that there are not more than two adjacent binary 1's in the 5/4 coded signal.

The NRZO coding circuit 18 provides a signal change intermediate a bit cell and a response to each binary signal applied at the input of the NRZO coding circuit 18, as shown in FIG. 3 (*c*). The NRZO coded signal is composed of three frequencies. Flux reversals occurs at one, two and three bit cell intervals.

Flip-flop 38 provides an NRZO signal delayed by one bit cell interval as shown in FIG. 3(*d*) with respect to the NRZO signal generated by the coding circuit 18. The logical intersection of the NRZO signal and the $NRZO_D$ signal depicted in FIG. 3(*e*) is provided by the EXCLUSIVE OR gate 42 and the inverter 44.

The modulated NRZO coded signal provided by the modulation circuit 20 is shown in FIG. 3(*f*). Flux reversals are inserted by the modulation circuit 20 when the NRZO coded signal is maintained at a single level in excess of one bit cell interval. The modulation flux reversal frequency in the preferred embodiment as indicated in FIG. 3(*f*) is 2 flux reversals per bit cell interval.

Figure 4:
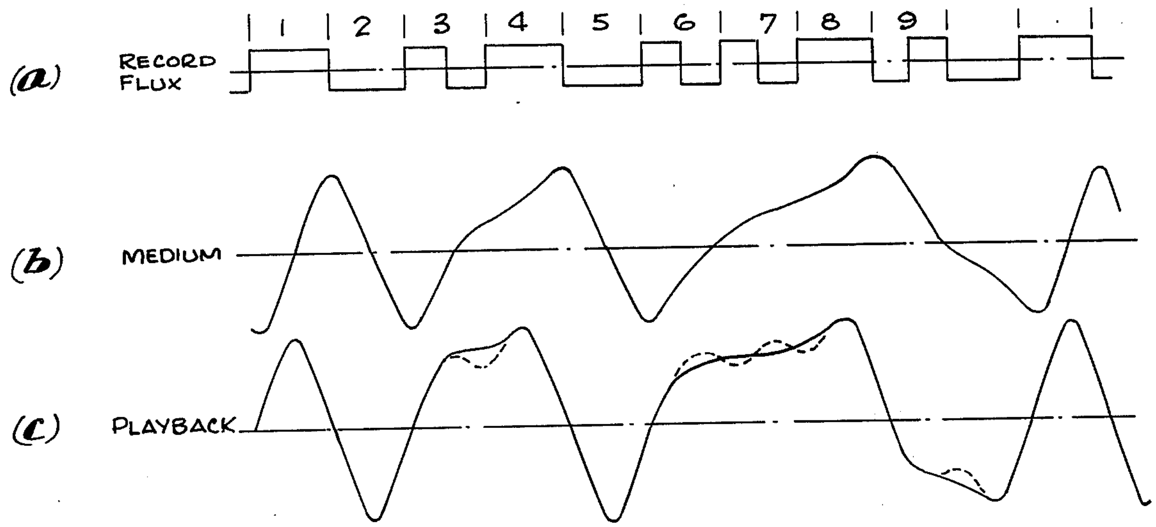
FIG. 4 comprises three different signal waveforms illustrating typical media magnetization and playback signals corresponding to a given recording flux in accordance with this invention.

FIG. 4 depicts a typical recorded flux pattern and an associated playback signal obtained from a given recording flux in accordance with the invention. Note that the record flux of FIG. 4(*a*) has modulated flux reversals in bit intervals 3, 6, 7 and 9. The magnetization of the medium as shown in FIG. 4(*b*) indicates limited response during the bit intervals 3, 6, 7 and 9 to the modulation components which exceed the resolution frequency of the medium. Upon playback, as shown in FIG. 4(*c*), depending upon the particular characteristic of the medium, the high flux reversals resulting from modulation may be detected to a limited extent, the dashed line indicating such resolution.

The data recovery circuit 14 depicted in FIG. 1, includes a playback head 60 coupled to an amplifier circuit 62. A filter circuit 64 couples the amplifier circuit 62 to a slope detection circuit 66.

The playback head 60 is coupled to the amplifier circuit 62 to provide a signal of sufficient strength to be further decoded. Typically, in high track density storage systems having a track density in excess of about 500 tracks per inch and having a nominal track width of 1 mil, the signal picked up by the playback head is weak, typically on the order of 350 microvolts, where the impedance of the playback head 60 is about 300 ohms. Thus, the design of the amplifier circuit 62, particularly its first stage is important. Though the design of such an amplifier circuit will be apparent to one skilled in the art, it is noted that the generally low signal-to-noise ratio supplied by the head requires consideration of such parameters as semiconductor noise, common mode rejection and head impedance optimization. The amplifier 62 typically has three or four stages to provide sufficient signal gain for further recovery.

The filter circuit 64 is coupled to the amplifier circuit 62 to optimize final signal characteristic by attenuating frequency components beyond a tri-frequency bandwidth while passing components within the bandwidth provided by the NRZO encoder 18 and to provide a reference for the slope detection circuit 66. The filter circuit 64 is utilized to remove high frequency roll off. By way of example, the filter circuit 64 comprises an operational amplifier having a resistor and capacitor in parallel, between a negative input of the operational amplifier and an output of the operational amplifier. A coupling capacitor coupled to the amplifier circuit provides isolation. A resistor is coupled between ground and a terminal of the coupling capacitor opposite the amplifier circuit 62. Another resistor is coupled between the negative input of the operational amplifier and the coupling capacitor terminal opposite the amplifier circuit 62, while a further resistor is coupled between ground and the positive terminal of the operational amplifier providing a reference thereto.

Figure 5:
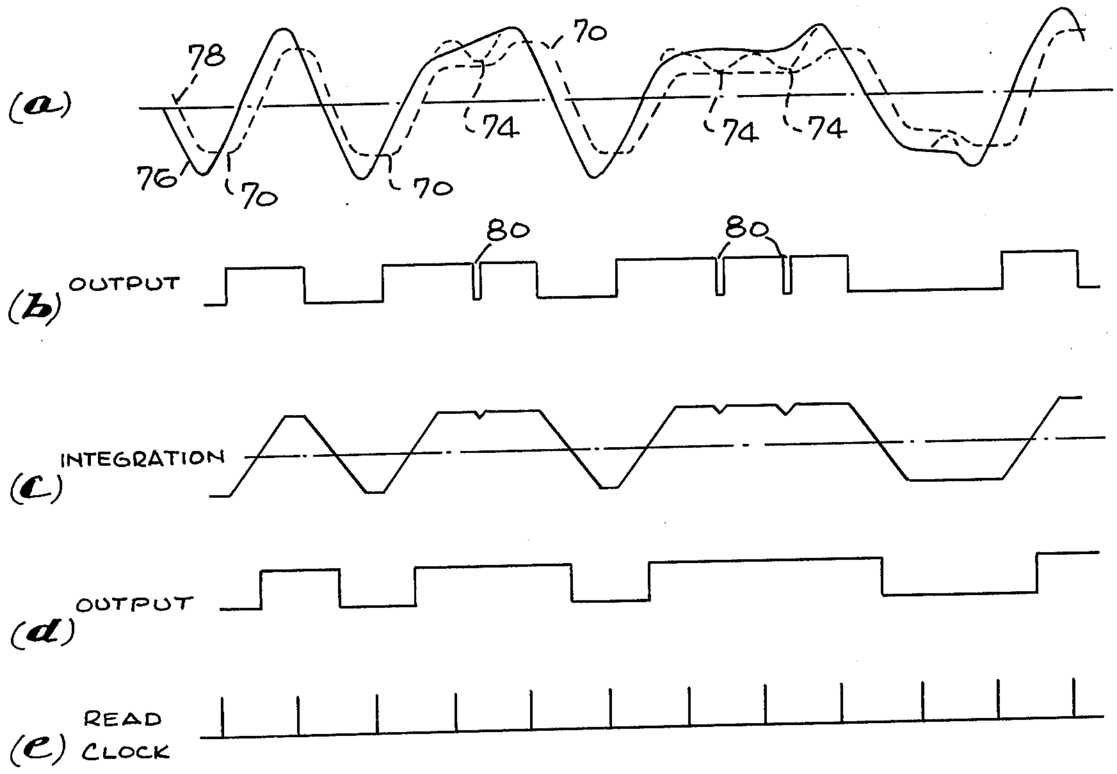
FIG. 5 comprises five different signal waveforms illustrating playback signals provided by the embodiment depicted in FIG. 1.

In the example shown in FIG. 1 the slope detection circuit 66 includes an emitter follower circuit 68 comprising transistors Q1 and Q2 to provide a truncated signal. The output of the filter circuit 64 is applied to the bases of Q1 and Q2. The emitters of Q1, an NPN transistor, and Q2, a PNP transistor, are applied to a capacitor C1 coupled to ground which provides a shifting circuit. As the voltage applied to the bases of Q1 and Q2 changes polarity, the voltage across capacitor C1 becomes greater than the voltage at the bases of Q1 and Q2, causing a transition period during which one of the transistors Q1, Q2 turns off while the other of transistors Q1, Q2 begins to conduct. This results in relatively level voltage transitions 70 shown in FIG. 5(*a*), which, when compared with the signal from the filter circuit 64 provide a fairly accurate relative indicator of a change in signal slope. The base-emitter voltage drops of Q1 and Q2 cause the signal of the phase shift circuit applied to a comparator 72 to be less than that of the reference signal applied to the comparator 72. Resistor R1 coupled between the emitters of Q1, Q2 and an input of the voltage comparator 72 attenuates this phase-shifted signal so as to eliminate crossover points resulting from resolution of modulation components 74 shown in FIG. 5(*a*). A biasing resistor R2 is coupled between the second input of the voltage comparator 72 and ground. Thus, the output of filter circuit 64 is applied as a reference input to the voltage comparator 72 such that the comparator 72 provides an indication representing the cross-over points of the curves 76 and 78 of FIG. 5(*a*). The output of the comparator 72 is shown in FIG. 5(*b*). Indentations 80 represent intersections of the curves 76 and 78 resulting from modulation frequency media resolution which has not been filtered.

In configurations where the indentations 80 are present, their elimination is achieved by coupling the voltage comparator 72 to an integrator 82 for integrating the output as depicted in FIG. 5(*e*) and coupling the integrator 82 to a zero crossing detector 84 to provide a coded binary output signal as indicated in FIG. 5(*d*). Thus the combination of the integrator 82 and the zero crossing detector 84 eliminate false crossover of signals as indicated in FIG. 5(*b*) when the signal contains components characteristic of higher frequency flux reversals indicated by the indentations 80. The output may then be decoded using a read clock and associated window timing margin of ±0.4 bit cell interval.

A binary coded decimal output may be obtained by applying the output from the zero crossing detector 84 to an NRZO decoding circuit comprising an EXCLUSIVE OR gate 86 coupled to a flip-flop 88. The flip-flop 88 provides an NRZ coded signal comprising 5 bit cell fields. Conversion is accomplished by applying the output of flip-flop 88 to a five bit shift register 90 coupled to a READ mode matrix 92. A counter 94 is coupled to the shift register 90 and is timed by clock signals applied to a terminal 96.

Although separate read and write shift registers, and counters are shown in FIG. 1 for simplicity of illustration, it should be recognized that the shift register 24, and the counter 28 may be used both for purposes of 4/5 coding during a WRITE mode and 5/4 decoding during a READ mode by utilizing a signal on a controller (not shown) to gate the states of the shift register cells to the appropriate one of matrices 26, 92.

The design of matrix 92 depends upon the particular coding of the original signal which has been written utilizing matrix 26. The READ mode matrix 92 is similar to the WRITE mode matrix 26, except that the truth table is generally inverted with respect to the table of FIG. 2 to obtain the proper binary coded decimal output.

In operation, the shift register 90 shifts five bits to load a 5 bit word thereon. The matrix 92 in communication with the shift register 90 applies the appropriate binary coded four bit word to the bit cells C2, C3, C4, C5, such that the outgoing data corresponds to the inverse of the chart of FIG. 2 except that the BCD output is applied respectively to C2, C3, C4 and C5 rather than C1, C2, C3 and C4.

Thus the invention provides an optimal system for compactly recording information on a magnetic medium allowing a high track density by minimizing intersymbol interference and increasing relative timing window margins, as well as allowing a high bit density.

While the invention has been particularly shown and described with reference to the preferred embodiment thereof, it will be understood by those skilled in the art that various changes in form and details may be made therein without departing from the spirit and scope of the invention.

What is claimed is:

1. In a high track density magnetic recording system in which digital information is represented by magnetic flux changes on a magnetic medium, apparatus for maintaining a high integrity recorded signal with high linear bit density comprising:

means for converting an incoming bit stream to a converted bit stream comprising five bit cell fields, each of the five bit cell fields representing a corresponding ordered group of four bits from the incoming bit stream, the converted bit stream comprising a first bilevel signal having a first level and a second level, and having not more than two cells at the first level adjacent one another;

means responsive to the converted bit stream for generating a second bilevel signal, the second bilevel signal changing from one level to the other level in response to the occurrence of the second level generated by the means for converting, thereby providing a self-clocking signal of known component frequency; and means coupled to the second bilevel signal generating means for providing a signal in response thereto having a modulated component for minimizing fringing field effects of nearby tracks.

2. The invention as set forth in claim 1 and in which the first level is a binary 1 and the second bilevel signal generating means comprises an NRZO coding circuit.

3. The invention as set forth in claim 1 and in which the means for providing a signal having a modulated component comprises means for reversing a recording head flux upon the maintenance of the second bilevel signal at a uniform level for an interval in excess of about one bit cell.

4. The invention as set forth in claim 3 and including means for reversing the recording head flux at intervals of about one-half bit cell.

5. The invention as set forth in claim 1 and further including means for reconstructing information from recorded magnetic flux patterns comprising:

slope detector means for obtaining a signal representing a change in slope polarity in a signal responsive to the magnetic flux pattern; and means for attenuating modulation frequency flux reversal components.

6. A high track density magnetic recording system comprising:

means responsive to an incoming signal having an average information density per bit cell interval for providing an information coded self-clocking signal having a reduced average information density per bit cell interval comprising a conversion circuit for providing the reduced average information density and coupled to an encoder providing the self-clocked signal; and means for selectively modulating the information coded signal for limiting intersymbol interference between adjacent tracks.

7. The invention as set forth in claim 6 and in which the information coded signal providing means comprises a 5/4 conversion circuit coupled to a non-return-to-zero type encoder.

8. The invention as set forth in claim 6 and in which the modulation means comprises means for altering the information coded signal when the signal is maintained at a single level in excess of a given interval.

9. The invention as set forth in claim 6 and in which the first signal responsive means comprises means for providing a signal having not more than two adjacent bit cell intervals at a first binary signal level and means responsive thereto for providing a binary signal reversing in response to the first binary signal level.

10. A high track density magnetic recording system having apparatus for obtaining a high integrity recorded signal comprising:

a conversion circuit for converting an incoming data bit stream having an associated clocking window margin to a converted data bit stream comprising five bit cell fields, each of the five bit cell fields representing a corresponding ordered group of four bits from the incoming bit stream, the converted bit stream comprising a binary signal having not more than two adjacent binary 1's;

an NRZO coding circuit for providing a signal having three component flux reversal frequencies in response to the binary signal having not more than two adjacent binary 1's and providing an enhanced associated clocking window margin for increasing the signal integrity of the system; and a modulation circuit coupled to the NRZO encoding circuit for providing a signal having a modulation frequency component upon the maintenance of an NRZO coded signal at a single binary level in excess of a given interval for limiting intersymbol interference between adjacent tracks and enhancing signal integrity.

11. The invention as set forth in claim 10 and in which the conversion circuit comprises a five bit shift register having an input for receiving an incoming data bit stream, a decoding matrix communicataing with the shift register and a counter coupled to the shift register such that a fifth count state of the counter causes the matrix to force a bit configuration of each of the five bit cells of the shift register to a coded five bit cell field configuration such that a bit stream composed of five bit cell fields contains not more than two adjacent binary 1's.

12. The invention as set forth in claim 10 and in which the NRZO encoder comprises an EXCLUSIVE OR gate having an input coupled to a least significant bit output of the shift register, an output of the EXCLUSIVE OR gate coupled to a FLIP-FLOP and a complementary output of the FLIP-FLOP coupled to another input of the EXCLUSIVE OR gate, such that a change in polarity of an uncomplemented output of the shift register occurs only upon the occurrence of a zero during a bit cell interval.

13. The invention as set forth in claim 10 and in which the modulation circuit comprises:

a FLIP-FLOP coupled to the NRZO encoder for providing a delayed NRZO signal;

an EXCLUSIVE OR gate, an input of which is coupled to the delayed NRZO signal and another input coupled to the NRZO signal for providing an ouput representing the logical intersection of the NRZO signal with the delayed NRZO signal;

means coupled to the delayed NRZO signal and the logical intersection signal for providing the delayed NRZO signal except during the occurrence of the intersection signal during which time a modulation frequency is applied.

14. The invention as set forth in claim 13 and in which the delayed NRZO signal is delayed by one bit cell interval with respect to the NRZO signal and in which the modulation component introduces flux reversals at about one-half bit cell intervals.

15. A high track density information storage system having a data recovery circuit comprising:

means for providing an amplified electrical signal in response to a movement of a playback head with respect to a magnetic medium;

filter means responsive to the electrical signal providing means for passing amplified electrical signal components within a tri-frequency bandwidth; and slope detection means coupled to the filter means for providing an output signal related to changes in slope polarity of the filtered signal comprising:

means providing a truncated signal in response to the filtered signal;

means for shifting the truncated signal with respect to the filtered signal; and comparator means for detecting crossings of the filtered signal with respect to the shifted and truncated signal.

16. The invention as set forth in claim 15 and further comprising resistance means coupled to the comparator means for reducing the magnitude of the shifted and truncated signal applied to the comparator with respect to the filtered signal to eliminate cross-over detection by the comparator between the shifted and truncated signal and modulation frequency components of the filtered signal.

17. A high track density magnetic recording system having apparatus for obtaining a high integrity recorded signal comprising:

a conversion circuit for converting an incoming data bit stream to a converted data bit stream, the converted data bit stream having not more than two adjacent bits at a first binary level;

means responsive to the converted data bit stream for providing a three-frequency signal having a primary frequency component and additional frequency components of one-half and one-third the primary frequency; and means for modulating the three-frequency signal to reduce peak shifting and to reduce intersymbol interference between adjacent tracks.

18. The invention as set forth in claim 17 and in which the means for modulating the three-frequency signal comprises means for introducing modulation components after the three-frequency signal is maintained at a single level in excess of one bit cell interval.

19. The invention as set forth in claim 18 and in which the modulation means introduces a modulation signal double the primary frequency.

20. A high track density magnetic recording system having apparatus for obtaining a high integrity recording signal comprising:

means responsive to an ordered incoming data bit stream for providing a three-frequency signal, the three-frequency signal having a primary frequency and frequency components of one-half and one-third the primary frequency; and modulation means coupled to the three-frequency signal providing means for reversing the three-frequency to reduce the maximum distance between flux reversals, thereby reducing peak shift and intersymbol interference adjacent tracks.

21. The invention as set forth in claim 20 and in which:

the modulation means comprises means for reversing the three-frequency signal at an even multiple of the primary frequency.

22. The invention as set forth in claim 21 and in which:

the modulation means comprises means for modulating the three-frequency signal upon maintenance of the three-frequency signal at a single level for one-bit cell interval.

23. A high density magnetic recording system comprising:

a modulation circuit responsive to an information coded self-clocking three-frequency signal of the type having a primary frequency and frequency components of one-half and one-third of the primary frequency, the modulation means for reversing the three-frequency signal to reduce the maximum distance between flux reversals, thereby reducing peak shifting and intersymbol interference, the modulation circuit comprising means for reversing the three-frequency signal after maintenance of the three-frequency signal at a single level in excess of approximately one bit cell.

24. The invention as set forth in claim 23 and in which the three-frequency signal is modulated at an even multiple of the primary frequency.

25. The invention as set forth in claim 23 and in which the modulation circuit comprises:

means for delaying the three-frequency signal for one bit cell interval with respect to the three-frequency signal;

means for providing a signal representing the logical intersection of the three-frequency signal and the delayed three-frequency signal; and means responsive to the three-frequency signal and the logical intersection signal for providing a three-frequency output signal except during the occurrence of the intersection signal during which time the output signal is modulated at an even multiple of one flux reversal per bit cell interval.

26. In a high density magnetic recording system in which digital information is represented by magnetic flux changes on a magnetic medium, apparatus for maintaining a high integrity recorded signal with high linear bit density comprising:

means for converting an incoming bit stream to a converted bit stream comprising fields having a fixed integral number of bits, each of the fields representing a corresponding ordered group of bits of less than the fixed integral number from the incoming bit stream, the converted bit stream comprising a first bi-level signal having a first level and a second level, and having not more than two bit cells at the first level adjacent one another;

means responsive to the converted bit stream for generating a second bi-level signal, the second bi-level signal changing from one level to the other level in response to the occurrence of the second level generated by the converting means, for providing a self-clocking tri-frequency signal having components limited to a primary frequency and one-half and one-third the primary frequency; and means coupled to the second bi-level signal generating means for providing a signal in response thereto having a modulated component for minimizing intersymbol interference between linearly adjacent bits and adjacent tracks.

27. The invention as set forth in claim 26 and in which the means for providing a signal having a modulated component comprises means for reversing a recording head flux upon the maintenance of the second bi-level signal at a uniform level for an interval in excess of about one bit cell.

28. The invention as set forth in claim 27 and including means for reversing the recorded head flux at intervals of about one-half bit cell.

29. The invention as set forth in claim 26 and including means for reversing the recording head flux during selected time intervals at a frequency of at least two flux reversals per bit cell.

30. A high track density magnetic recording system comprising:

means responsive to an incoming signal having an average information density per bit cell interval for providing an information coded three-frequency self-clocking signal, the three-frequency self-clocking signal reversing at one, two and three bit cell intervals, the self-clocking signal having a reduced average information density per bit cell interval with respect to the incoming signal and comprising a conversion circuit for providing the reduced average information density and coupled to an encoder providing the self-clocking signal; and means for selectively modulating the information encoded signal for enhancing the ratio of clocking window margin to maximum time between flux reversals to reduce peak shifting and limit intersymbol interference between adjacent tracks.

31. The invention as set forth in claim 30 and in which:

the modulating means comprises means for reversing the self-clocking signal in response to maintenance of the self-clocking signal at the same level for one bit cell interval.

32. The invention as set forth in claim 30 and in which the modulation means comprises means for providing a signal reversing at one-half bit cell intervals between level changes in the self-clocking signal, following the maintenance of the self-clocking signal at a single level for one bit cell interval.

33. The invention as set forth in claim 30 and comprising:

means for delaying the self-clocking signal for one bit cell interval with respect to the self-clocking signal;

means for providing a signal representing the logical intersection of the self-clocking and the delayed self-clocking signal; and means responsive to the self-clocking signal and the logical intersection signal for providing a self-clocking output signal except during the occurrence of the intersection signal during which time the output signal is modulated at an even multiple of one flux reversal per bit cell.

* * * * *

UNITED STATES PATENT AND TRADEMARK OFFICE

CERTIFICATE OF CORRECTION

PATENT NO. : 3,930,265

DATED : December 30, 1975

INVENTOR(S) : Noboru Kimura

It is certified that error appears in the above-identified patent and that said Letters Patent are hereby corrected as shown below:

Column 2, line 15, "1/4" should read --1/2--. Column 3, line 59, "NRZo" should read --NRZO--. Column 4, line 54, after "characteristic" and before "± 1/4" delete "of". Column 5, line 19, "cause" should read --causes--. Column 6, line 61, after "an" change "imcoming" to --incoming--. Column 7, line 8, "occurs" should read --occur--. Column 9, line 47, after "two" and before "cells" insert --bit--. Column 10, line 66, "communicataing" should read --communicating--.

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*